United States Patent
Gross et al.

(10) Patent No.: US 11,559,971 B2
(45) Date of Patent: Jan. 24, 2023

(54) CONDUCTIVE COMPOSITE AND METHOD FOR MANUFACTURING A CONDUCTIVE COMPOSITE

(71) Applicant: The Boeing Company, Chicago, IL (US)

(72) Inventors: Adam F. Gross, Santa Monica, CA (US); Ashley Dustin, Los Angeles, CA (US); Andrew P. Nowak, Los Angeles, CA (US); Xin Guan, Monterey Park, CA (US); Adam E. Sorensen, Glendale, CA (US); Richard E. Sharp, Weldon Spring, MO (US)

(73) Assignee: The Boeing Company, Chicago, IL (US)

( * ) Notice: Subject to any disclaimer, the term of this patent is extended or adjusted under 35 U.S.C. 154(b) by 393 days.

(21) Appl. No.: 16/867,765

(22) Filed: May 6, 2020

(65) Prior Publication Data

US 2021/0347152 A1 Nov. 11, 2021

(51) Int. Cl.
| | | |
|---|---|---|
| *B32B 25/10* | (2006.01) | |
| *B32B 25/20* | (2006.01) | |
| *B32B 5/02* | (2006.01) | |
| *B64C 1/06* | (2006.01) | |
| *B64C 3/20* | (2006.01) | |
| *B05D 3/00* | (2006.01) | |

(52) U.S. Cl.
CPC .............. *B32B 25/10* (2013.01); *B32B 5/02* (2013.01); *B32B 25/20* (2013.01); *B64C 1/068* (2013.01); *B64C 3/20* (2013.01); *B32B 2307/202* (2013.01); *B32B 2605/18* (2013.01)

(58) Field of Classification Search
CPC ........... B32B 25/10; B32B 25/20; B32B 5/02; B32B 2307/202; B32B 2605/18; B64C 1/068; B64C 3/20
See application file for complete search history.

(56) References Cited

U.S. PATENT DOCUMENTS

| | | | |
|---|---|---|---|
| 4,015,981 A | 4/1977 | Rogova et al. | |
| 4,686,135 A * | 8/1987 | Obayashi | B32B 27/308 |
| | | | 428/476.3 |
| 5,173,256 A | 12/1992 | Booth et al. | |
| 9,199,438 B2 * | 12/2015 | Bories-Azeau | B32B 33/00 |
| 2007/0098815 A1 | 5/2007 | Bernstein | |
| 2011/0281070 A1 * | 11/2011 | Mittal | H05K 1/097 |
| | | | 428/221 |

(Continued)

FOREIGN PATENT DOCUMENTS

| | | |
|---|---|---|
| KR | 101866118 | 6/2018 |
| WO | WO 2007/100382 | 9/2007 |
| WO | WO 2016/143251 | 9/2016 |

OTHER PUBLICATIONS

Urbaniak-Domagaka: "Electrical Properties of Polyesters," Electrical and Electronic Properties of Materials, IntechOpen: http://dx.doi.org/10.5772/intechopen.78612 (2018).

(Continued)

*Primary Examiner* — Joanna Pleszczynska
(74) *Attorney, Agent, or Firm* — Walters & Wasylyna LLC

(57) ABSTRACT

A conductive composite includes a first layer of elastomeric polymer, a layer of electrically conductive paste on the first layer of elastomeric polymer, and a second layer of elastomeric polymer on the layer of electrically conductive paste. A reinforcement mesh is in contact with the layer of electrically conductive paste.

31 Claims, 6 Drawing Sheets

(56) References Cited

U.S. PATENT DOCUMENTS

| 2014/0248496 | A1* | 9/2014 | Kuwajima | B32B 27/30 |
| | | | | 428/422 |
| 2019/0092994 | A1 | 3/2019 | Gwin | |
| 2019/0198190 | A1 | 6/2019 | Dustin et al. | |
| 2019/0217585 | A1 | 7/2019 | Takamatsu et al. | |

OTHER PUBLICATIONS

Bartlett et al: "Stretchable, High K Dielectric Elastomers through Liquid-Metal Inclusions," Advanced Materials, vol. 28, pp. 3726-3731 (2016).
Bettezzati et al: "The Viscosity of Liquid Metals and Alloys," ActaMetallurgica, vol. 37, No. 7, pp. 1791-1802 (1989).
Boley et al: "Direct Writing of Gallium-Indium Alloy for Stretchable Electronics," Advanced Functional Materials, vol. 24, pp. 3501-3507 (2014).
Dickey et al.: "Emerging Applications of Liquid Metals Featuring Surface Oxides," Applied Materials and Interfaces, vol. 6, pp. 18369-18379 (2014).
Fassler et al: "Liquid Phase Metal Inclusions for a Conductive Polymer Composite," Advanced Functional Materials, vol. 27, pp. 1928-1932 (2015).
Jagatheesan et al: "Electromagnetic Shielding Behaviour of Conductive Filler Composites and Conductive Fabrics—A review," Indian Journal of Fibre & Textile Research, vol. 39, pp. 329-342 (2014).
Jeong et al: "Mechanically Stretchable and Electrically Insulating Thermal Elastomer Composite by Liquid Alloy Droplet Embedment," Scientific Reports, vol. 5, No. 18257 (2015).
Kramer et al: "Masked Deposition of Gallium-Indium Alloys for Liquid-Embedded Elastomer Conductors," Advanced Functional Materials, vol. 23, pp. 5292-5296 (2013).
Liang et al: "Liquid Metal Sponges for Mechanically Durable, All-Soft, Electrical Conductors," Journal of Materials Chemistry C, vol. 5, pp. 1586-1590 (2017).
Pande et al: "Improved Electromagnetic Interference Shielding Properties of MWCNT-PMMA Composites Using Layered Structures," Nanoscale Res Lett 4:327-334 (2009).
Jeyakumar et al: "Rheology of Liquid Metal and Alloys," Journal of Non-Newtonian Fluid Mechanics, vol. 166, pp. 831-838 (2011).
Park et al: "Improved Electromagnetic Interference Shielding Properties Through the Use of Segregate Carbon Nanotube Networks," Materials, vol. 12 (2019).
Los et al: "Metal-Polymer Composites for Electromagnetic Interference Shielding Applications," Polimery 2016, vol. 61, No. 10.
Shui et al: "Nickel Filament Polymer-Matrix Composites with Low Surface Impedance and High Electromagnetic Interference Shielding Effectiveness," Journal of Electronic Materials, vol. 26, No. 8 (1997).
European Patent Office, Extended European Search Report, App. No. 21172186.5 (dated Oct. 6, 2021).

* cited by examiner

CONDUCTIVE COMPOSITE AND METHOD FOR MANUFACTURING A CONDUCTIVE COMPOSITE

FIELD

The present application relates to the field of conductive composites.

BACKGROUND

A conductive composite, broadly defined, is any composite having significant electrical or thermal conductivity. Such conductive composites have a broad range of uses in areas such as telecommunications, power generation and distribution, defense, aerospace, medicine, and other areas.

Conductive composites are commonly manufactured by and/or properties are achieved by incorporating a polymeric material with solid conductive particles. To achieve sufficient conductivity, i.e., to reach percolation, high particle loading, typically in excess of 45 volume %, is often needed. The polymers used with these particle loading levels are normally rigid materials. As a consequence, these particle loading levels result in conductive films and coatings that have properties such as elongation at break, tensile strength, and thermal stability that make them inappropriate or difficult to use.

Accordingly, those skilled in the art continue with research and development in the field of conductive composites.

SUMMARY

In one embodiment, a conductive composite includes a first layer of elastomeric polymer, a layer of electrically conductive paste on the first layer of elastomeric polymer, and a second layer of elastomeric polymer on the layer of electrically conductive paste. A reinforcement mesh is in contact with the layer of electrically conductive paste.

In another embodiment, a method for manufacturing a conductive composite includes forming a first layer of elastomeric polymer. A layer of electrically conductive paste is formed on the first layer of elastomeric polymer. A second layer of elastomeric polymer is formed on the layer of electrically conductive paste. The layer of electrically conductive paste is reinforced with a reinforcement mesh.

Other embodiments of the disclosed conductive composite and method for manufacturing a conductive composite will become apparent from the following detailed description, the accompanying drawings and the appended claims.

DETAILED DESCRIPTION

Figure 1:
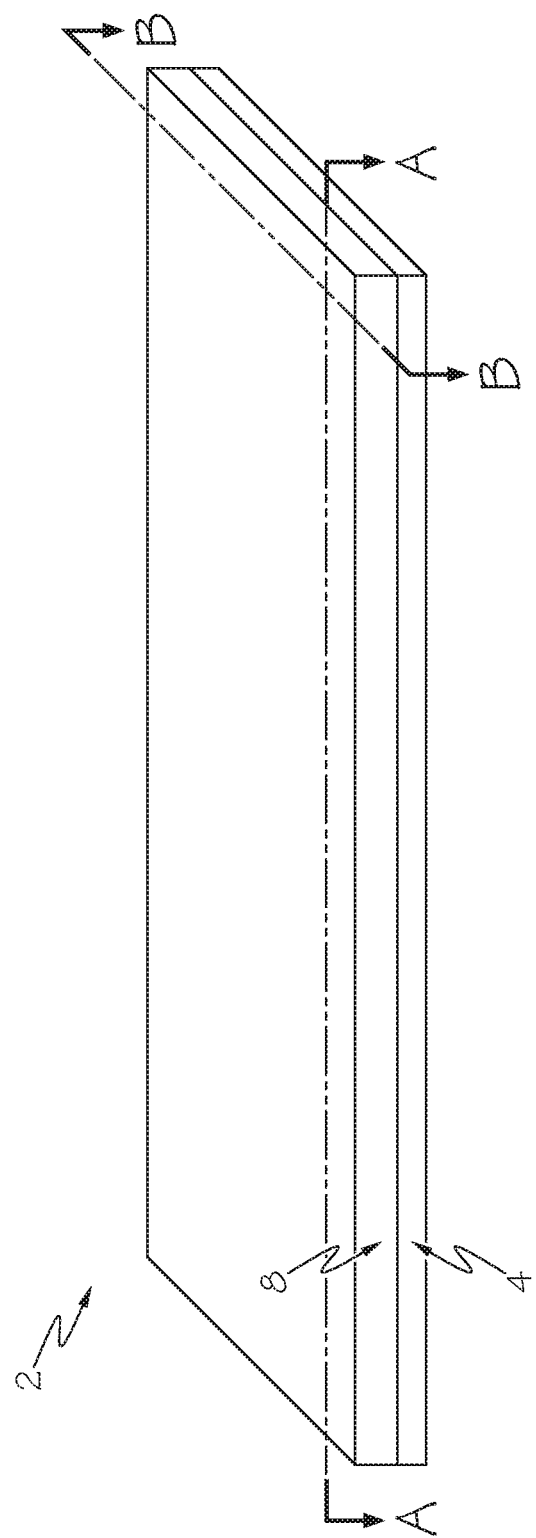
FIG. 1 is a perspective view of an exemplary conductive composite according to an exemplary embodiment of the present description.
Figure 2:
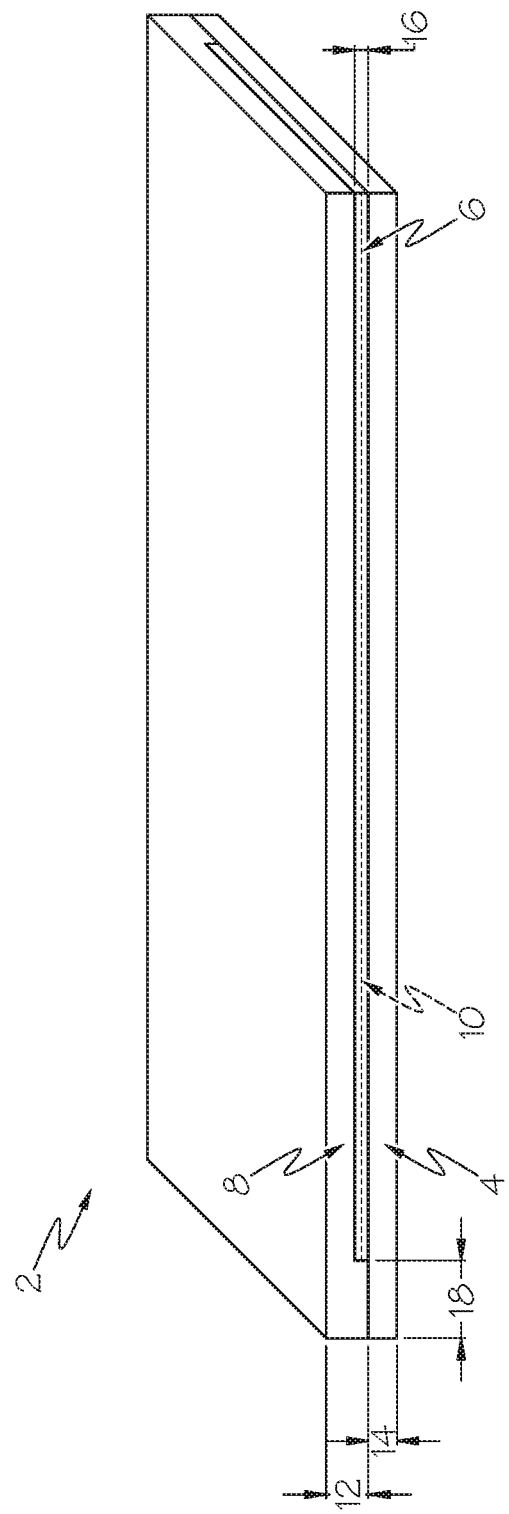
FIG. 2 is a sectional perspective view of the exemplary conductive composite of FIG. 1, sectioned along lines A-A and B-B.

As shown in FIGS. 1 and 2, the conductive composite 2 includes a first layer of elastomeric polymer 4, a layer of electrically conductive paste 6 on the first layer of elastomeric polymer 4, and a second layer of elastomeric polymer 8 on the layer of electrically conductive paste 6, and a reinforcement mesh 10 in contact with the layer of electrically conductive paste 6.

An elastomeric polymer is a polymer that shows elasticity at high strain levels. In an aspect, the elastomeric polymer of the present description is a polymer that shows exhibits an elongation at break of greater than about 50%. In another aspect, the elastomeric polymer of the present description is a polymer that exhibits an elongation at break of greater than about 100%. In yet another aspect, the elastomeric polymer of the present description is a polymer that exhibits an elongation at break of greater than about 200%. The elongation at break is measured as a percent the material is strained before it breaks upon application of tensile force. A percentage of the original length is used to express the elongation at break.

In an aspect, the elastomeric polymer of the present description is an electrical insulator. In an aspect, the elastomeric polymer of the present description is an electrical insulator having an electrical conductivity of less than about $1 \times 10^{-8}$ S/m. In another aspect, the elastomeric polymer of the present description is an electrical insulator having an electrical conductivity of less than about $1 \times 10^{-9}$ S/m. In yet another aspect, the elastomeric polymer of the present description is an electrical insulator having an electrical conductivity of less than about $1 \times 10^{-10}$ S/m.

The first layer of elastomeric polymer 4 and the second layer of elastomeric polymer 8 can include at least one of a thermoplastic polymer, a thermoset polymer, and combinations thereof. In an aspect, suitable elastomeric polymers for the first layer of elastomeric polymer 4 and the second layer of elastomeric polymer 8 have viscosities of from about 1000 to about 100,000 cP under typical processing conditions. In another aspect, suitable elastomeric polymers for the first layer of elastomeric polymer 4 and the second layer of elastomeric polymer 8 have viscosities of from about 1000 to about 25,000 cP under typical processing conditions. In yet another aspect, suitable elastomeric polymers for the first layer of elastomeric polymer 4 and the second layer of elastomeric polymer 8 have viscosities of from about 25,000 to about 50,000 cP under typical processing conditions. In yet another aspect, suitable elastomeric polymers for the first layer of elastomeric polymer 4 and the second layer of elastomeric polymer 8 have viscosities of from about 50,000 to about 75,000 cP under typical processing conditions. In yet another aspect, suitable elastomeric polymers for the first layer of elastomeric polymer 4 and the second layer of elastomeric polymer 8 have viscosities of from about 75,000 to about 100,000 cP under typical processing conditions. In certain examples, suitable thermoplastic elastomers for use herein have viscosities of from about 1000 to about 50,000 cP under typical processing conditions. As used herein, the term "typical processing conditions" includes temperatures of from about room temperature (about 25° C.) to about 400° C., from about room temperature to about 200° C., or from about room temperature to about 100° C. Measuring techniques for measuring viscosity can include a viscometer, rheometer, or other suitable viscosity testing equipment. Such thermoplastic elastomers are convenient for making flexible materials.

Suitable elastomeric polymers for the first layer of elastomeric polymer 4 and the second layer of elastomeric polymer 8 include thermoplastic elastomeric polymers, thermoset elastomeric polymers, and combinations thereof. For example, suitable elastomeric polymers for the first layer of elastomeric polymer 4 and the second layer of elastomeric polymer 8 include siloxane, fluorosiloxane, perfluoropolyether, polybutadiene, polyester, polycarbonate, polyurethane, polyurea, polyurethane-urea, epoxy, acrylate, natural rubber, butyl rubber, polyacrylonitriles, ethylene propylene diene monomer (EPDM) rubber, or combinations thereof. The first layer of elastomeric polymer 4 and the second layer of elastomeric polymer 8 may be formed from the same or different polymer composition.

In the context of the present description, a paste is any high viscosity fluid. The paste of the present description is not cured or hardened into a solid state. Rather, the paste of the present description retains the high viscosity fluid state. In an aspect, the paste of the present description is a material having a viscosity in a range of from about 2,000 to about 1,000,000 cP. In another aspect, the paste of the present description is a material having a viscosity in a range of from about 2,000 to about 500,000 cP. In yet another aspect, the paste of the present description is a material having a viscosity in a range of from about 2,000 to about 100,000 cP.

An electrically conductive paste is a paste capable of carrying an electrical current. In an aspect, the electrically conductive paste of the present description is a paste having an electrical conductivity of greater than about $1\times10^1$ S/m. In another aspect, the electrically conductive paste of the present description is a paste having an electrical conductivity of greater than about $1\times10^2$ S/m. In yet another aspect, the electrically conductive paste of the present description is a paste having an electrical conductivity of greater than about $1\times10^3$ S/m. In yet another aspect, the electrically conductive paste of the present description is a paste having an electrical conductivity of greater than about $1\times10^4$ S/m. In yet another aspect, the electrically conductive paste of the present description is a paste having an electrical conductivity of greater than about $1\times10^5$ S/m. The layer of electrically conductive paste (6) may be homogeneous or heterogeneous.

In an aspect, the electrically conductive paste includes a metal or alloy with a melting temperature (e.g. melting point) below about 60° C. In one aspect, the metal or alloy has a melting temperature (e.g. melting point) below about 50° C. In another aspect, the metal or alloy has a melting temperature (e.g. melting point) below about 40° C. In yet another aspect, the metal or alloy has a melting temperature (e.g. melting point) below about 30° C. In yet another aspect, the metal or alloy has a melting temperature (e.g. melting point) below about 25° C. In yet another aspect, the metal or alloy has a melting temperature (e.g. melting point) below about 20° C. The electrically conductive paste of the present description is not limited to including a metal or alloy. For example, the electrically conductive paste of the present description could include a conductive polymer instead of a metal or alloy with a melting temperature (e.g. melting point) below about 60° C.

The metal or alloy with a melting temperature below about 60° C. of the electrically conductive paste can include any metal or alloy that has a melting temperature below about 60° C. In an aspect, the metal or alloy includes at least one of gallium, mercury, indium, tin, bismuth, phosphorus, lead, zinc, cadmium, antimony, and combinations thereof. Suitable metals include, for example, gallium and mercury. Suitable alloys include, for example, alloys formed from gallium, mercury, indium, tin, bismuth, phosphorus, lead, zinc, cadmium, antimony, and combinations thereof. In certain examples, the alloy is an alloy comprising at least about 50% by weight of gallium, bismuth, indium, mercury, or combinations thereof. In certain examples, tin, phosphorus, lead, zinc, cadmium, antimony, or combinations thereof can be included to modify the melting temperature of the alloy. In an example, alloy used in the conductive composites disclosed herein is an alloy comprising indium and from about 50 to about 97% by weight of gallium. In another example, the low melting alloy used to form the conductive composites disclosed herein is an alloy comprising from about 15 to about 30% by weight of indium, from about 55 to about 80% by weight of gallium, and at least one metal selected from tin and zinc. Weight percentage refers to the weight amount of the respective component of the metal or alloy over the total weight of the metal or alloy. Suitable gallium alloys are commercially available from Indium Corporation. Exemplary suitable alloys include Indalloy 46L, Indalloy 51, Indalloy 60, Indalloy 77, Indalloy 14, Indalloy 15, Indalloy 117, Indalloy 16, Indalloy 17, Indalloy 136, and Indalloy 19.

In an aspect, the layer of electrically conductive paste includes a thickening agent. When used, the thickening agent is typically combined with the metal or alloy having a melting temperature below about 60° C. and is, as a result, a component of the layer of electrically conductive paste.

The thickening agent can include, for example, at least one of an organic thickening agent, an inorganic thickening agent, and combinations thereof. When the thickening agent includes an organic thickening agent, the organic thickening agent can include, for example, at least one of maltose, carbon, and combinations thereof. When the thickening agent includes an inorganic thickening agent, the inorganic thickening agent can include, for example, at least one of silver, copper, brass, bronze, nickel, stainless steel, carbon, coated carbon, titanium, tungsten, and combinations thereof.

In certain examples, the thickening agent has an average aspect ratio in a range of from 1 to about 2. A low aspect ratio thickening agent can take the form of, for example, a powder. The low aspect ratio thickening agent can have, for example, an average maximum dimension in range of from about 0.1 to about 500 μm, such as in range of from about 50 to about 150 μm. In other examples, the thickening agent has an average aspect ratio of greater than about 2, such as in a range of from about 2 to about 2000. The high aspect ratio thickening agent can take the form of, for example, rods or wires. The high aspect ratio thickening agent can have, for example, an average maximum dimension in a range of from about 0.1 to about 10 mm.

The thickening agents used herein function as viscosity modifiers and can aid in resisting or minimizing flow of the metal or alloy within the layer of electrically conductive paste. The thickening agents used herein may be inorganic or organic materials. The thickening agents do not dissolve the metal or alloy or otherwise form solutions with the metal or alloy; they remain solid when mixed with the metal or alloy but are wet by the metal or alloy. The thickening agents are typically used as particles, e.g., in the shape of rods, wires, substantially spherical particles, or mixtures thereof, and the particle size dictates how readily the powder homogenizes with the metal or alloy to form a paste. Typically, thickening agents that have higher surface areas will be better thickeners than agents with lower surface areas. Combinations of thickening agent and the metal or alloy are selected to achieve the appropriate wetting of the thickening agent and rheology or modulus of the paste. The particle sizes and quantities are selected to produce paste compositions having a tan delta value greater than about 1, i.e., pastes that behave more like a liquid than a solid, permitting the resulting composite to be flexible.

The thickening agents may be conductive or non-conductive. Conductive thickening agents increase conductivity for the resulting conductive composite 2 or enables for the reduction of the amount of electrically conductive paste 6 required for achieving the same conductivity.

In certain examples, the thickening agent comprises particles, e.g., rods or wires, of an inorganic thickening agent having an average aspect ratio greater than about 2, i.e., where the length is at least about twice the width. Average aspect ratio can be measured using a microscope.

In other examples, the thickening agent comprises particles, e.g., substantially spherical particles, of an inorganic thickening agent having an average aspect ratio less than about 2, i.e., where the length is at most about twice the width. In certain examples, the thickening agent comprises substantially spherical particles of an inorganic thickening agent having an average particle size of from about 0.1 to about 500 µm (from about 100 to about 500,000 nm). Particles of this size range have suitable surface area to function as thickening agents to form a paste with the metal or alloy. In certain examples, the thickening agent comprises substantially spherical particles of an inorganic thickening agent having an average particle size of from about 1 to about 25 µm, or from about 25 to about 50 µm, or from about 50 to about 75 µm, or from about 75 to about 100 µm, or from about 100 to about 150 µm, or from about 150 to about 200 µm, or from about 200 to about 250 µm, or from about 250 to about 300 µm, or from about 300 to about 350 µm, or from about 350 to about 400 µm, or from about 450 to about 500 µm. In other examples, the thickening agent comprises substantially spherical particles of an inorganic thickening agent having an average particle size of from about 50 to about 150 µm. In certain examples, the particles of inorganic thickening agent having an average particle size of from about 0.1 to about 5 µm.

In an example, the thickening agent is an inorganic thickening agent having an average aspect ratio greater than about 2 and comprising rods or wires having lengths of from about 0.01 to about 10 mm. In certain examples, the rods of inorganic thickening agent have lengths of from about 0.01 to about 0.5 mm, or from about 0.05 to about 10 mm, or from about 0.01 to about 10 mm, or from about 0.01 to about 10 mm, or from about 0.01 to about 0.1 mm, or from about 0.1 to about 1 mm, or from about 0.1 to about 1 mm, or from about 1 to about 5 mm, or from about 5 to about 10 mm. Use of conductive rods or wires contributes to the conductivity of the final composite to a larger extent than generally spherical conductive particles. The overall conductivity is tunable through adjusting either the amount of metal or alloy or the amount of thickening agent.

In certain examples, the inorganic thickening agent comprises a powder having particles with a mixture of rods or wires and substantially spherical particles or comprises a mixture of rods, wires, and substantially spherical particles.

In certain examples, the thickening agent comprises particles of an organic thickening agent having an average particle size of from about 0.1 to about 500 µm. In certain examples, the thickening agent comprises particles of an organic thickening agent having an average particle size of from about 1 to about 25 µm, or from about 25 to about 50 µm, or from about 50 to about 75 µm, or from about 75 to about 100 µm, or from about 100 to about 150 µm, or from about 150 to about 200 µm, or from about 200 to about 250 µm, or from about 250 to about 300 µm, or from about 300 to about 350 µm, or from about 350 to about 400 µm, or from about 450 to about 500 µm. In other examples, the thickening agent comprises particles of an organic thickening agent having an average particle size of from about 50 to about 150 µm. In certain examples, the particles of organic thickening agent having an average size of from about 0.1 to about 5 µm.

In examples in which the paste also includes a thickening agent, the thickening agent can be used in an amount that produces an appropriate viscosity and/or to modulate the conductive properties of the paste and resulting composite. Suitable concentrations of inorganic thickening agent in the pastes range from about 0.1% to about 20% by weight of the paste composition. Suitable concentrations of organic thickening agent in the pastes range from about 0.1% to about 40% by weight of the paste composition.

Suitable volume-based amounts of the thickening agent in the paste composition range from about 5 to about 50% by volume of the paste. In certain examples, the amount of the thickening agent is from about 5% to about 10%, or from about 5 to about 15%, or from about 10 to about 20%, or from about 15 to about 25%, or from about 20 to about 30%, or from about 25 to about 35%, or from about 30 to about 45% by volume of the paste composition. Such amounts are convenient for producing paste compositions having a tan delta value greater than 1, i.e., pastes that behave more like a liquid than a solid, permitting the resulting composite to be flexible.

As explained above, the amount of thickening agent can be reduced when powders with particles in the shape of rods or wires are used as the thickening agents. Suitable amounts of rod or wire thickening agents in the paste range from about 2 to about 40% by volume of the paste. In certain examples, the amount of the thickening agent is from about 2% to about 5%, or from about 5 to about 10%, or from about 10 to about 15%, or from about 15 to about 20%, or from about 20 to about 25%, or from about 25 to about 30%, or from about 30 to about 40% by volume of the paste composition.

Suitable electrical conductivity can be achieved in the conductive composites disclosed herein without necessitating high amounts of solid conductive particles in the paste, i.e., loadings of such particles greater than about 45 volume percent. However, in certain examples metallic particle loadings greater than about 45 volume percent may be employed in the paste if insufficient metal exists in the liquid phase to form a desired level of electrical connections between metallic particles. Thus, particle loading levels above about 45 volume percent, e.g., from about 45 to about 80 volume percent, may be used in the paste when necessary.

In certain examples, the thickening agent used to make the conductive composite is an organic thickening agent. Suitable organic thickening agents include compounds having a melting temperature above about 60° C., i.e., a temperature that will prevent the thickening agent from melting with the alloy, i.e., prior to or during manufacture of the conductive composite. Examples of such compounds are maltol, phenol, naphthalene, 1-naphthol, 2-naphthol, 4-pyridone, and carbon, including, for example, graphite and carbon black. Where the organic thickening agent is a compound having a phenolic hydroxy group, the compound can react with the isocyanate groups of a di- or polyisocyanate via the hydroxy, but the reaction would be slower than the urethane or urea forming reactions. Used appropriately, such compounds can be used to modify the characteristics of the resulting thickening agent. Alternatively, the organic thickening agent can be graphite or carbon particles.

In certain examples, the thickening agent is an inorganic thickening agent or a combination of inorganic thickening agents. Suitable inorganic thickening agents include metal oxides such as titanium dioxide, zinc oxide, an oxide of nickel, a metal or alloy having a melting temperature above about 60° C., or a ceramic material. The metal or alloy is selected to have a melting temperature above about 60° C. to prevent the thickening agent from melting prior to or during manufacture of the conductive composite. Suitable metals or alloys include metals or alloys of silver, copper, brass, bronze, nickel, stainless steel, carbon, coated carbon, titanium, tungsten, and combinations thereof.

The thickening agent may be a mixture of at least one organic thickening agent and at least one inorganic thickening agent. A mixture of organic and inorganic thickening agents can be used to modify the rheology or modulus of the paste.

In certain examples, the thickening agent comprises powders with particles in the shape of rods, wires, substantially spherical particles, or a mixture thereof, and the rods, wires, and substantially spherical particles comprise a metal or alloy of silver, copper, brass, nickel, stainless steel, steel, aluminum, carbon, coated carbon, titanium, tungsten, tin, zinc, and combinations thereof, a metal oxide of nickel, ceramics, and combinations thereof, wherein the substantially spherical particles have an average particle size of from about 0.1 to about 500 um (from about 100 to about 500,000 nm) and the rods and wires have lengths of from about 0.01 to about 10 mm.

In an aspect, the layer of electrically conductive paste includes a compatibilizing agent. The compatibilizing agent can include, for example, at least one of an organic compatibilizing agent, an inorganic compatibilizing agent, and combinations thereof. When the compatibilizing agent includes an organic compatibilizing agent, the organic compatibilizing agent can include, for example, a surfactant, such as an ionic surfactant, a nonionic surfactant, and combinations thereof. When the compatibilizing agent includes an inorganic compatibilizing agent, the inorganic compatibilizing agent can include, for example, metallic nanoparticles.

The compatibilizing agents used herein improve the workability (e.g., flowability, ease of application) of the paste. Without wishing to be bound by theory, it is believed that the mixing of the compatibilizing agent with the low melting metal or alloy produces a coating of compatibilizing agent on the surface of particles or droplets of the low melting metal or alloy, and as a result lowers the surface energy of the low melting metal or alloy. In addition, again without wishing to be bound by theory, it is believed that the compatibilizing agent forms a monolayer or several layers on the low melting metal or alloy droplets and reduces or prevents oxidation of the metal or alloy, but it does not create a shell of the kind that results from using acids.

In certain examples, the compatibilizing agents used herein can also be used to thicken the paste, i.e., to increase the viscosity of the paste.

In addition, compatibilizing agent can be added to revitalize a paste if oxidation has occurred. As used herein, "revitalize" means that a mixture of compatibilizing agent and low melting metal or alloy that has separated can be returned to the form of a uniform paste by incorporating additional compatibilizing agent into the separated mixture and subjecting the mixture to appropriate shear conditions as discussed below.

In examples in which the paste includes particles of a thickening agent, as discussed elsewhere herein, the disclosed compatibilizing agents are believed to permit penetration into pores or voids formed between particles of the thickening agent. Penetration into pores will bind the liquid metal or alloy to the thickener by creating a capillary pressure holding the liquid metal or alloy between the particles.

In certain examples, the pastes used to form the conductive composites contain the low melting metal or alloy and the compatibilizing agent at a weight ratio of low melting metal or alloy to compatibilizing agent of from about 5:1 to about 50:1, or from about 10:1 to about 30:1, or from about 15:1 to about 25:1, or from about 20:1 to about 25:1. Thus, the amount of compatibilizing agent as a percentage of the low melting metal or alloy ranges from about 2 weight % to about 20 weight %. Particularly useful amounts of compatibilizing agent range from about 4 weight % to about 10 weight %. Weight percentage refers to the weight amount of the compatibilizing agent over the total weight of paste. Phase separation is to be avoided. At higher levels of compatibilizing agent, phase separation may occur and this can be addressed using a thickening agent of the kind disclosed elsewhere herein.

In certain examples, the compatibilizing agent comprises inorganic, e.g., metallic, nanoparticles having an average particle size of less than about 100 nm, or less than about 90 nm, or less than about 80 nm, or less than about 70 nm, or less than about 60 nm, or less than about 50 nm, or less than about 40 nm, or less than about 30 nm, or less than about 20 nm, in any linear dimension. The particle sizes mentioned herein can be measured using a Coulter Counter or Multisizer, for example. Suitable nanoparticles comprise metals that are insoluble, i.e., do not dissolve, in the low melting metal or alloy. Suitable metals for use as the nanoparticles are those in which gallium has less than about 5 mol % solubility in the metal at room temperature. Examples of suitable metals for use as nanoparticle compatibilizing agents herein include metal or alloys of silver, copper, brass, bronze, nickel, stainless steel, carbon, coated carbon, titanium, tungsten, and combinations thereof.

In certain examples, the compatibilizing agent is a nonionic amphiphilic compound or mixture of nonionic amphiphilic compounds. Suitable nonionic amphiphilic compounds include fatty alcohol alkoxylates including fatty alcohol ethoxylates, alkylphenol alkoxylates including alkylphenol ethoxylates, fatty acid alkoxoxylates including fatty acid ethoxylates, alkoxylated amines including ethoxylated amines, fatty acid amides, polyoxyethylene-polyoxypropylene copolymers, fatty acid esters of polyhydroxy compounds, glycerol fatty acid esters, sorbitan fatty acid esters, sucrose fatty acid esters, alkyl polyglucosides, fatty amine oxides, sulfoxides, organophosphine oxides, and mixtures thereof.

In certain examples, the compatibilizing agent is an ionic compound. Suitable ionic amphiphilic compounds include anionic compounds and cationic compounds. Representative anionic compounds are alkyl sulfates, alkyl ether sulfates, alkyl sulfonates, alkyl ether sulfonates, alkyl phosphates, and alkyl carboxylates. Representative cationic compounds are quaternary ammonium compounds, monoalkylammonium salts, dialkylammonium salts, and trialkylammonium salts.

The choice of the particular anionic compound (or mixture thereof) or cationic compound (or mixture thereof) and the amount thereof used to form the layer of electrically conductive paste will be determined by the particular elastomeric polymer used to manufacture the conductive composite. The type and amount of the anionic or cationic compound will be selected to avoid degrading or depolymerizing the elastomeric polymer.

In certain examples, the compatibilizing agent is a surfactant.

In certain examples, the compatibilizing agent is a nonionic amphiphilic compound or a mixture of such compounds. Particularly useful nonionic amphiphilic compounds are the alkylphenol ethoxylates. Representative alkylphenol ethoxyates are octylphenol ethoxylates such as Triton™ X-100 (polyethylene glycol p-(1,1,3,3-tetramethylbutyl)-phenyl ether having an average of 9.5 ethylene oxide units) and nonylphenol ethoxylates.

Other particularly useful nonionic amphiphilic compounds are the poloxamer, which are tri-block copolymers of poly(ethylene oxide) poly(propylene oxide)-poly(ethylene oxide) (PEO-PPO-PEO). For example, PLURONIC nonionic amphiphilic compound is suitable.

The conductive composites of the present description can also include additional materials to impart other characteristics to the conductive composites. In an aspect, the conductive composites includes an additive to increase thermo-oxidative stability. When the conductive composite include an additive to increase thermo-oxidative stability, the additive to increase thermo-oxidative stability can include, for example, at least one of a phosphate, an iron oxide, a phenolic, an antioxidant, a metal passivator, and combinations thereof. The thermo-oxidative stabilizer is a material or an additive that increases thermal oxidative stability. The thermo-oxidative stabilizer can be included into the paste composition or added to the elastomeric polymer layers prior to forming the conductive composite. Depending on the characteristics desired in the conductive composite and the environment in which the conductive composite will be deployed, the thermo-oxidative stabilizer can be a phosphate, iron oxide, phenolic antioxidant, metal passivator, or combination thereof. Addition of a thermo-oxidative stabilizer to the conductive composites disclosed herein expands the operating temperature range of the conductive composite. Suitable metal passivators include nitrates such as nitric acid, citrates such as citric acid, tungstates, molybdates, chromates, and mixtures thereof.

Preparation of the pastes can be accomplished by, for example, mixing the low melting metal or alloy, compatibilizing agent, and any optional components with centrifugal planetary mixer or shear mixing capabilities. The resulting paste can be stored for future use.

In certain examples, the paste compositions disclosed herein and useful for preparing the conductive composites can have a loss modulus (G") greater than the storage modulus (G'), i.e., the paste compositions have a tan delta value greater than 1. Paste compositions of this disclosure therefore behave more like liquids than solids. The paste compositions of this disclosure have viscosities of from about 500 to about 100,000 cP at 1 Hz when measured using a dynamic shear rheometer according to ASTM D7175.

The thickness of each layer of the conductive composite 2 can be adjusted as necessary to achieve the characteristics desired of the final product. In an aspect, as shown in FIG. 2, the first layer of elastomeric polymer 4 has a first thickness 14, and the second layer of elastomeric polymer 8 has a second thickness 12. The first thickness 14 and second thickness 12 may each be within a range of from about 0.01 mm to about 100 mm. In another aspect, the first thickness 14 and second thickness 12 may each be within a range of from about 0.1 mm to about 10 mm. For example, the first thickness 14 and second thickness 12 can each be about 1 mm. The first thickness 14 may be the same or different than the second thickness 12. The layer of conductive fluorofluid has third thickness 16, which can be less than or equal to at least one of the first thickness 14 and the second thickness 12. Alternatively, the third thickness 16 can be greater than the at least one of the first thickness 14 and the second thickness 12. In an aspect, the third thickness 16 is less than a total of the first thickness 14 and the second thickness 12. In another aspect, the third thickness 16 is less than at least one of the first thickness 14 and the second thickness 12. For example, the first thickness 14 and the second thickness 12 can be about 1 mm, and the third thickness 16 can be less than about 1 mm. An overall thickness of the conductive composite 2 can be with a range of about 0.03 mm to about 200 mm. In an aspect, an overall thickness of the conductive composite 2 can be with a range of about 0.1 mm to about 100 mm. In another aspect, an overall thickness of the conductive composite 2 can be with a range of about 0.5 mm to about 10 mm.

The conductive composite 2 can include one or more additional layers of elastomeric polymer and one or more additional layers of electrically conductive paste. For example, the conductive composite can contain a total of five layers, three layers of elastomeric polymer alternating with two layers of electrically conductive paste.

In an aspect, the conductive composite 2 is the form of a laminate, in which a continuous layer of electrically conductive paste 6 is sandwiched between the first layer of elastomeric polymer 4 and the second layer of elastomeric polymer 8. The continuous layer of electrically conductive paste 6 may be flat or curved. In one expression, the continuous layer of electrically conductive paste 6 has a length that is much greater than a thickness of the continuous layer of electrically conductive paste 6. In an aspect, the length of the continuous layer of electrically conductive paste 6 is at least five times the thickness of the continuous layer of electrically conductive paste 6. In another aspect, the length of the continuous layer of electrically conductive paste 6 is at least twenty times the thickness of the continuous layer of electrically conductive paste 6. In yet another aspect, the length of the continuous layer of electrically conductive paste 6 is at least fifty times the thickness of the continuous layer of electrically conductive paste 6. In another expression, the continuous layer of electrically conductive paste 6 has a length and a width that are much greater than a thickness of the continuous layer of electrically conductive paste 6. In an aspect, the length and the width of the continuous layer of electrically conductive paste 6 are at least five times the thickness of the continuous layer of electrically conductive paste 6. In another aspect, the length and the width of the continuous layer of electrically conductive paste 6 are at least twenty times the thickness of the continuous layer of electrically conductive paste 6. In yet another aspect, the length and the width of the continuous layer of electrically conductive paste 6 are at least fifty times the thickness of the continuous layer of electrically conductive paste 6.

The edges of the conductive composite 2 around the layer of electrically conductive paste 6 can be sealed in any manner. In an aspect, edge of the conductive composite 2 can be sealed by contact of the second layer of elastomeric polymer 8 with the first layer of elastomeric polymer 4. For example, the first layer of elastomeric polymer 4 and the second layer of elastomeric polymer 8 may be separated by the layer of electrically conductive paste 6 except at the edges of the conductive composite 2 around the layer of electrically conductive paste 6 where the first layer of elastomeric polymer 4 and the second layer of elastomeric polymer 8 are in contact with one another. The second layer of elastomeric polymer 8 may be capable of curing to the first layer of elastomeric polymer 4 to form an effective encapsulant. The edge length 18 of the edges of the conductive composite 2 around the layer of electrically conductive paste prevents overstressing the bonding between the first layer of elastomeric polymer 4 and the second layer of elastomeric polymer 8. In an aspect, the edge length 18 is greater than at least one of the first thickness 14 and the second thickness 12.

The layer of electrically conductive paste 6 of the present description provides electrical conductivity to the conductive composite 2 without necessitating rigidity, and the high viscosity of the layer of electrically conductive paste inhibits leakage of the electrically conductive paste during coating or use. The present description further includes, as shown in FIGS. 2 and 3B, a reinforcement mesh 10 in contact with the layer of electrically conductive paste 6. The reinforcement mesh 10 in contact with the layer of electrically conductive paste 6 alters the flow property of the electrically conductive paste 6 to further reduce the possibility for leaching and better retain the electrically conductive paste 6 within the conductive composite 2.

The reinforcement mesh 10 may move freely with respect to the first layer of elastomeric polymer 4 and the second layer of elastomeric polymer 8 to avoid reduction of elasticity of the conductive composite 2, or the reinforcement mesh 10 may be attached to one of the first layer of elastomeric polymer 4 or the second layer of elastomeric polymer 8 to provide additional structural integrity.

The reinforcement mesh 10 may be electrically conductive or electrically non-conductive. A conductive reinforcement mesh 10 increases conductivity for the resulting conductive composite 2, or the reinforcement mesh 10 enables for the reduction of the amount of electrically conductive paste 6 for achieving the same conductivity. Reducing the amount of electrically conductive paste 6 in the conductive composite 2 can further reduce the possibility for leaching and better retain the electrically conductive paste 6 within the conductive composite 2. In an aspect, the conductivity of an electrically conductive mesh is greater than about $1 \times 10^3$ S/m. In another aspect, the conductivity of an electrically conductive mesh is greater than about $1 \times 10^4$ S/m. In yet another aspect, the conductivity of an electrically conductive mesh is greater than about $1 \times 10^5$ S/m.

In an aspect, the reinforcement mesh 10 is a continuous reinforcement mesh layer in contact with the continuous layer of electrically conductive paste 6. In one expression, the continuous reinforcement mesh layer has a length that is much greater than a thickness of the continuous reinforcement mesh layer. In an aspect, the length of the continuous reinforcement mesh layer is at least five times the thickness of the continuous reinforcement mesh layer. In another aspect, the length of the continuous reinforcement mesh layer is at least twenty times the thickness of the continuous reinforcement mesh layer. In yet another aspect, the length of the continuous reinforcement mesh layer is at least fifty times the thickness of the continuous reinforcement mesh layer. In another expression, the continuous reinforcement mesh layer has a length and a width that are much greater than a thickness of the continuous reinforcement mesh layer. In an aspect, the length and the width of the continuous reinforcement mesh layer are at least five times the thickness of the continuous reinforcement mesh layer. In another aspect, the length and the width of the continuous reinforcement mesh layer are at least twenty times the thickness of the continuous reinforcement mesh layer. In yet another aspect, the length and the width of the continuous reinforcement mesh layer are at least fifty times the thickness of the continuous reinforcement mesh layer. The reinforcement mesh 10 may have a length and width that is greater than, equal to, or less than the continuous layer of electrically conductive paste 6.

Additionally, if the conductive composite 2 is the form of a laminate, the laminate construction allows for co-location of the continuous layer of electrically conductive paste 6 and the continuous layer of reinforcement mesh 10, in which the continuous layer of electrically conductive paste 6 and the continuous layer of reinforcement mesh 10 are sandwiched between the first layer of elastomeric polymer 4 and the second layer of elastomeric polymer 8.

The reinforcement mesh 10 may be or include a fabric, such a knit fabric, a woven fabric, or combinations thereof. The fabric may be a non-conductive fabric, a conductive fabric, or combinations thereof. A conductive fabric increases conductivity for the resulting conductive composite 2.

The non-conductive fabric may be or include, for example, polyether polyurea copolymer, latex, poly-paraphenylene terephthalamide, aramid, nylon, polyester, or combinations thereof. However, any fabric that is chemically suitable for use with the electrically conductive paste 6 may be used. A non-conductive fabric may be coated with a conductive material to result in a conductive fabric.

The conductive fabric may include or be formed from conductive filaments, coated non-conductive fabric, or combinations thereof. Exemplary conductive filaments include silver filaments, copper filaments, brass filaments, nickel filaments, stainless steel filaments, steel filaments, aluminum filaments, carbon filaments, coated carbon filaments, titanium filaments, tungsten filaments, tin filaments, zinc filaments, and combinations thereof. Exemplary coated non-conductive fabrics include metallic coated polyether-polyurea copolymer, metallic coated latex, metallic coated poly-paraphenylene terephthalamide, metallic coated aramid, metallic coated nylon, metallic coated polyester, carbon coated polyether-polyurea copolymer, carbon coated latex, carbon coated poly-paraphenylene terephthalamide, carbon coated aramid, carbon coated nylon, carbon coated polyester, and combinations thereof.

In certain examples, the conductive composites 2 of the present description exhibits a minimum sheet resistance of less than about 100 Ohm/sq. The sheet resistance of a particular conductive composite will depend on the ultimate use. For example, a minimum sheet resistance of less than about 100 Ohm/sq is preferred when the conductive composite is to be used to shield electrical components from electromagnetic radiation, e.g., to minimize electromagnetic interference that may disrupt or harm sensitive electronics. Sheet resistivity can be determined using a four point probe.

In certain examples, the conductive composites 2 of the present description exhibits an elongation at break greater than or equal to about 10%. In other examples, the conductive composites 2 of the present description exhibits an elongation at break greater than or equal to about 25%. In yet other examples, the conductive composites 2 of the present description exhibits an elongation at break greater than or equal to about 50%. The elongation at break is measured as a percent the material is strained before it breaks upon application of tensile force. A percentage of the original length is used to express the elongation at break.

In certain examples, the conductive composites 2 of the present description exhibits a tensile strength greater than or equal to about 3 MPa.

In certain examples, the conductive composites 2 of the present description has a density of less than about 7 g/mL, less than about 6 g/mL, less than about 5 g/mL, or less than about 4 g/mL. In certain examples, the conductive composite has a density of between about 2 and about 10 g/mL. In other examples, the conductive composite has a density between about 10 and about 20 g/mL. In still other examples, the conductive composite has a density between about 1 and about 5 g/mL, or between about 3 and about 8 g/mL. This parameter can readily be measured by determining the mass of a known volume or measuring the volume of water displaced by a known mass.

In certain examples, the conductive composites 2 of the present description exhibit a maximum bulk conductivity of about $5 \times 10^5$ S/m at 20° C.

In certain examples, the conductive composite is flexible. In certain examples, the conductive composite has a tensile strength greater than or equal to about 3 MPa. In certain examples, the conductive composite is flexible and has a tensile strength greater than or equal to about 3 MPa.

This disclosure also provides products, items, and structures comprising a substrate carrying a layer of a conductive composite disclosed herein. Such products, items, and structures can be made by heating a thermoplastic or thermoset conductive composite as disclosed herein and applying it to a substrate. In certain examples, the conductive composite can be a portion of an aircraft, such as all or a portion of at least one of a wing and a fuselage of an aircraft. In certain examples, the conductive composite can be at least one of a seal and a gasket.

Figure 3A:
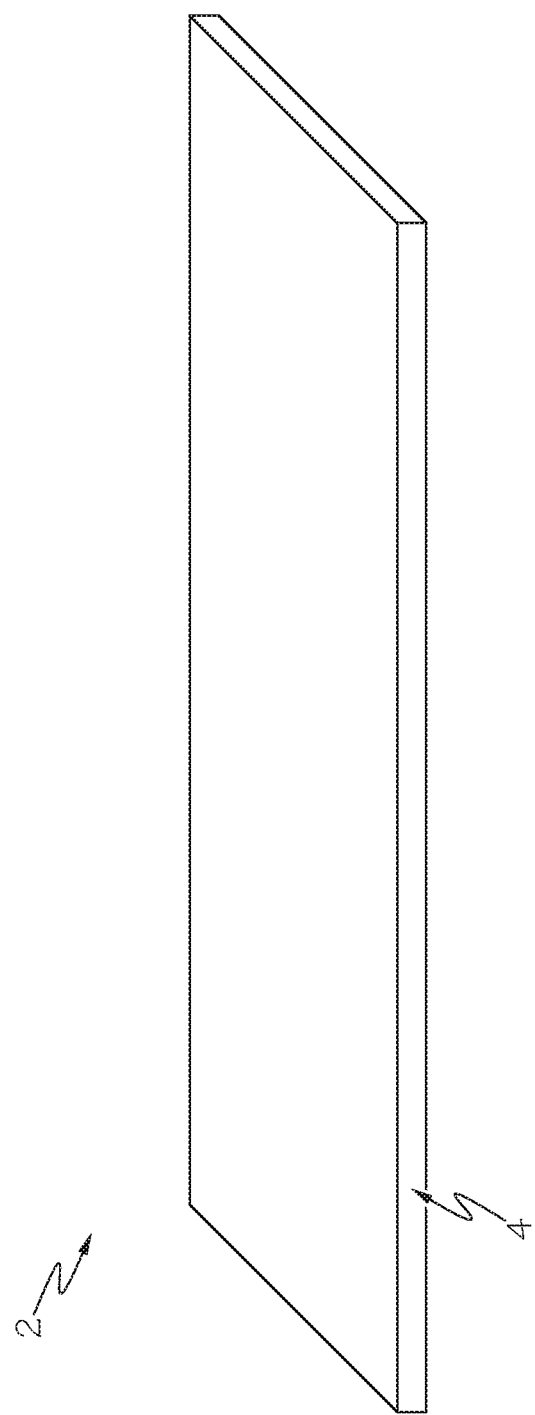
FIGS. 3A to 3C are perspective views illustrating steps for manufacturing the exemplary conductive composite of FIGS. 1 and 2.
Figure 3B:
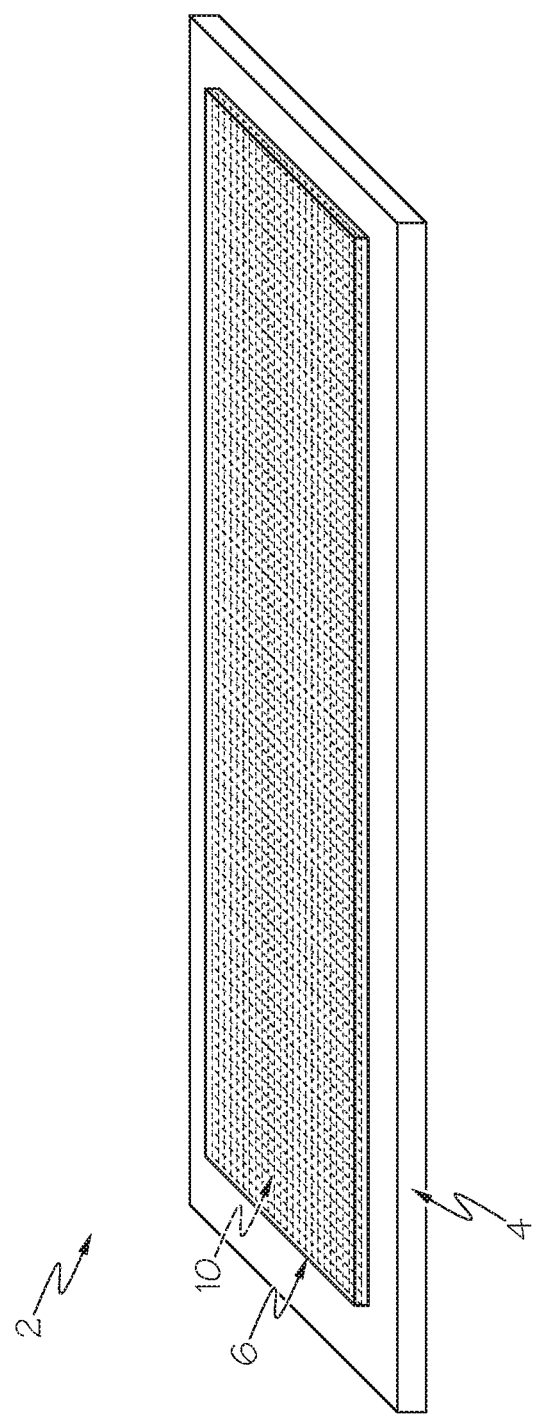
Figure 3C:
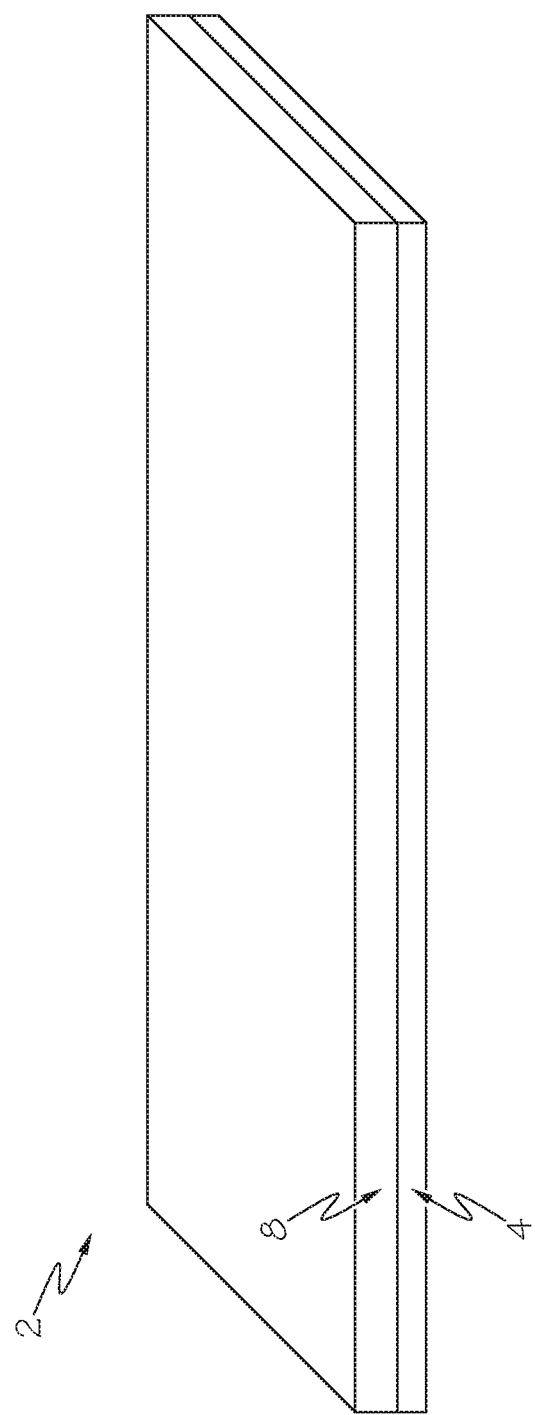

As shown in FIGS. 3A, 3B, and 3C, the conductive composites 2 of the present disclosure can be made by forming a first layer of elastomeric polymer 4 (see FIG. 3A) and forming a layer of electrically conductive paste 6 on the first layer of elastomeric polymer 4 (see FIG. 3B). The layer of electrically conductive paste 6 is reinforced with a reinforcement mesh 10 either before or after forming the layer of electrically conductive paste 6. Then, a second layer of elastomeric polymer 8 is formed on the layer of electrically conductive paste 6 (see FIG. 3C).

In an aspect, the step of forming the first layer of elastomeric polymer includes curing the first layer of elastomeric polymer. The step of curing the first layer of elastomeric polymer can include curing the first layer of elastomeric polymer.

In certain examples, the step of forming the layer of electrically conductive paste includes mixing the metal or alloy with the melting temperature below about 60° C. and the thickening agent. In other examples, the step of forming the layer of electrically conductive paste includes mixing the metal or alloy with the melting temperature below about 60° C., the thickening agent, and a compatibilizing agent. In other examples, the step of forming the layer of electrically conductive paste includes mixing the metal or alloy with the melting temperature below about 60° C., the thickening agent, and an additive to increase thermo-oxidative stability, and optionally a compatibilizing agent. In an aspect, the step of forming the layer of electrically conductive paste includes compounding the electrically conductive paste using shear mixing. The shear mixing can be performed at a rotation speed of in a range of from about 25 to about 2000 rpm, such as in a range of from about 25 to about 125 rpm. In another aspect, the step of forming the layer of electrically conductive paste includes infiltrating the reinforcement mesh 10 with the electrically conductive paste.

In certain examples, the step of forming the second layer of elastomeric polymer includes curing the second layer of elastomeric polymer. The step of curing the second layer of elastomeric polymer can include bonding the second layer of elastomeric polymer to the first layer of elastomeric polymer.

After forming the second layer of elastomeric polymer, the method of the present description may include trimming the conductive composite around the layer of electrically conductive paste. In an aspect, the trimming leaves an edge length around the layer of electrically conductive paste.

By way of example, the conductive composites of this disclosure can be made by layering a conductive paste onto the surface of a first cured or partially cured elastomeric polymer and by layering a second elastomeric polymer thereon.

In another example, the conductive composites of this disclosure can be made by spreading a conductive paste onto a non-stick surface, applying uncured elastomeric polymer over the paste, and then curing the elastomeric polymer. The conductive composite can then be conveniently removed from the non-stick surface by peeling the conductive composite from the non-stick surface. After removal from the non-stick surface, and if necessary or desirable, an additional layer of cured or uncured elastomeric polymer may be added over the electrically conductive paste and cured if necessary to produce a sandwich or laminate structure.

Laminate composites of this disclosure can be made by layering a conductive paste onto the surface of a first elastomeric polymer and applying a layer of a second elastomeric polymer over the layer of electrically conductive paste. The second elastomeric polymer may be the same or different than the first elastomeric polymer. Adding a layer of the second elastomeric polymer will encapsulate the layer of electrically conductive paste.

Laminate conductive composites of this disclosure can also be made by spreading a conductive paste onto a non-stick surface, applying uncured elastomeric polymer over the paste, and then curing the elastomeric polymer. The conductive composite can then be conveniently removed from the non-stick surface by peeling the conductive composite from the non-stick surface. Where necessary, a second elastomeric polymer (which may be the same or different than the first elastomeric polymer) can optionally be applied over the layer of electrically conductive paste. Adding a layer of the second elastomeric polymer will encapsulate the layer of electrically conductive paste.

The non-stick surface can be any suitable non-stick material. Examples of suitable non-stick materials include polytetrafluoroethylene, anodized aluminum, ceramics, and enameled cast iron.

This disclosure also provides products, items, and structures comprising a substrate carrying a layer of a conductive composite disclosed herein, and in certain examples a flexible conductive composite as disclosed herein. Such products, items, and structures can be made by heating a thermoplastic or thermoset conductive composite as disclosed herein and applying it to a substrate.

A conductive paste composition may be prepared by combining the low melting metal or alloy with the compatibilizing agent and mixing the resulting mixture sufficiently to form a uniform paste. The mixing can be accomplished with a shear mixer at about 25 to about 2500 rpm. In certain examples, the shear mixing to form the paste composition is carried out at about 25 to about 125 rpm, or at about 125 to about 250 rpm, or at about 250 to about 400 rpm, or at about 400 to about 700 rpm, or at about 700 to about 1500 rpm, or at about 1500 to about 2500 rpm. Alternatively, the mixing can be carried out using a centrifugal planetary mixer. The resulting paste can be stored for future use.

Additionally, the surfaces of the elastomeric polymer layers facing the layer of electrically conductive paste may be treated to improve wetting of the liquid metal. This can include ultraviolet treatment, plasma treatment, or corona discharge treatment. Additionally, a surfactant may be applied to the elastomeric polymer layers facing the layer of electrically conductive paste to improve wetting.

The following experimental examples illustrate additional features and properties of the conductive composite of the present description.

Example 1

Preparation of electrically conductive paste: 4.93 g of nonionic surfactant (Triton X100) was added to 49.63 g gallium alloy liquid metal and mixed at 2300 rpm for 2 minutes to form a smooth and flowable paste.

Preparation of infiltrated reinforcement mesh: a paint brush was used to spread the flowable conductive paste into a silver knit.

Preparation of laminate conductive composite: NuSil R21-2615 liquid silicone rubber is a two-part, translucent silicone system with a 1:1 part A to part B mixing ratio with a rapid thermal cure. Equal parts were weighed into a Flacktek container and mixed for 1 minute at 2300 rpm. The resulting homogenous resin was poured on top of a panel with a Mylar release film, and a 30 mil thick film was cast using a glass rod. The infiltrated reinforcement mesh (silver knit) was placed on top of the NuSil film, the remaining NuSil mixture poured atop the reinforcement mesh, and distributed evenly using a glass rod. A top panel, Mylar release film side faced down, was placed on top of the resin and a sheet of breather atop of the panel. A vacuum connector was placed inside the vacuum bag before sealing, a 0.5 inch slit was cut into the vacuum bag, and the vacuum hose connected through the slit. The vacuum pump was turned on as soon as the system was sealed and the pressure maintained at −25 inches Hg. The whole vacuum bagging setup was placed on top of a 60° C. hot place for rapid thermal cure for about 40 minutes. The conductive composite was removed from the setup after 1 hour. The thickness of this composite was about 0.05".

Example 2

Preparation of electrically conductive paste: 4.93 g of nonionic surfactant (Triton X100) was added to 49.63 g gallium alloy liquid metal and mixed at 2300 rpm for 2 minutes to form a smooth and flowable conductive paste.

Preparation of infiltrated reinforcement mesh: a paint brush was used to spread the flowable conductive paste into a Chloroban fabric.

Preparation of laminate conductive composite: NuSil R21-2615 liquid silicone rubber is a two-part, translucent silicone system with a 1:1 part A to part B mixing ratio with a rapid thermal cure. Equal parts were weighed into a Flacktek container and mixed for 1 minute at 2300 rpm. The resulting homogenous resin was poured on top of a panel with a Mylar release film, and a 30 mil thick film was cast using a glass rod. The infiltrated reinforcement mesh (Chloroban) was placed on top of the NuSil film, the remaining NuSil mixture poured atop the fabric, and distributed evenly using a glass rod. A top panel, Mylar release film side faced down, was placed on top of the resin and a sheet of breather atop of the panel. A vacuum connector was placed inside the vacuum bag before sealing, a 0.5 inch slit was cut into the vacuum bag, and the vacuum hose connected through the slit. The vacuum pump was turned on as soon as the system was sealed and the pressure maintained at −25 inches Hg. The whole vacuum bagging setup was placed on top of a 60° C. hot place for rapid thermal cure for about 40 minutes. The conductive composite was removed from the setup after 1 hour. The thickness of the resulting composite was about 0.03".

Table 1 shows mechanical properties for Example 1 of the present description, testing both before and after aging for 50 d at 100° C. in air.

TABLE 1

| | % Elongation at Break (pre-aging) | % Elongation at Break (post-aging) | Instant Failure Stress (MPa) (pre-aging) | Instant Failure Stress (MPa) (post-aging) |
|---|---|---|---|---|
| Example 1 | 65.8 +/− 8.1 | 25.4 +/− 5.1 | 4.5 +/− 0.6 | 1.9 +/− 0.4 |

Table 2 shows electrical conductivity properties for Examples 1 and 2 of the present description.

TABLE 2

| | Ga Alloy (Wt %) | Attenuation/Thickness (dB/mm) (pre-aging) | Attenuation/Thickness (dB/mm) (post-aging) |
|---|---|---|---|
| Example 1 | 23.9 | not determined | −13 |
| Example 2 | 43.3 | −22 | not determined |

Figure 4:
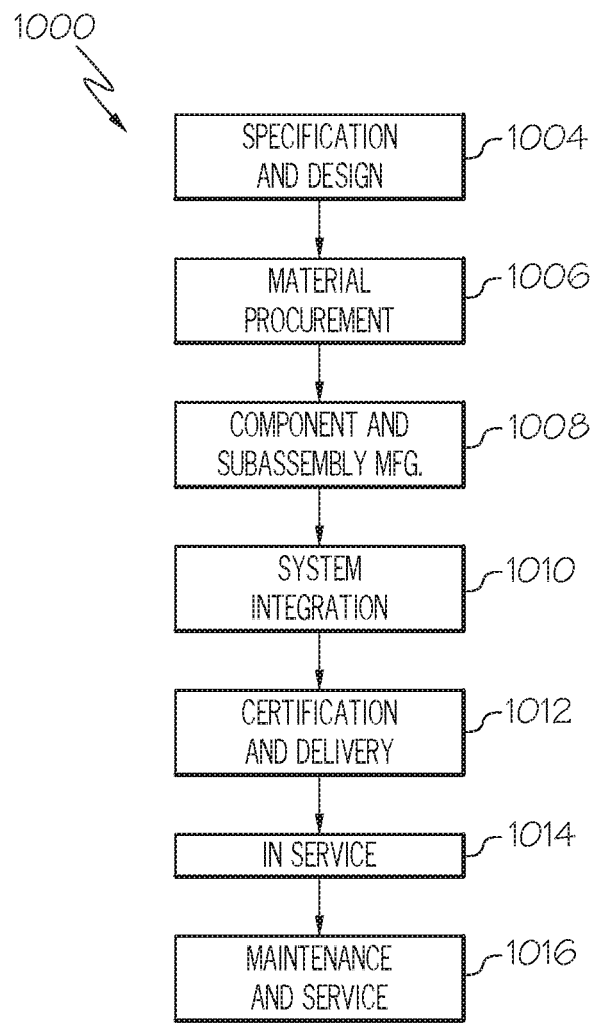
FIG. 4 is a flow diagram of an aircraft manufacturing and service methodology.
Figure 5:
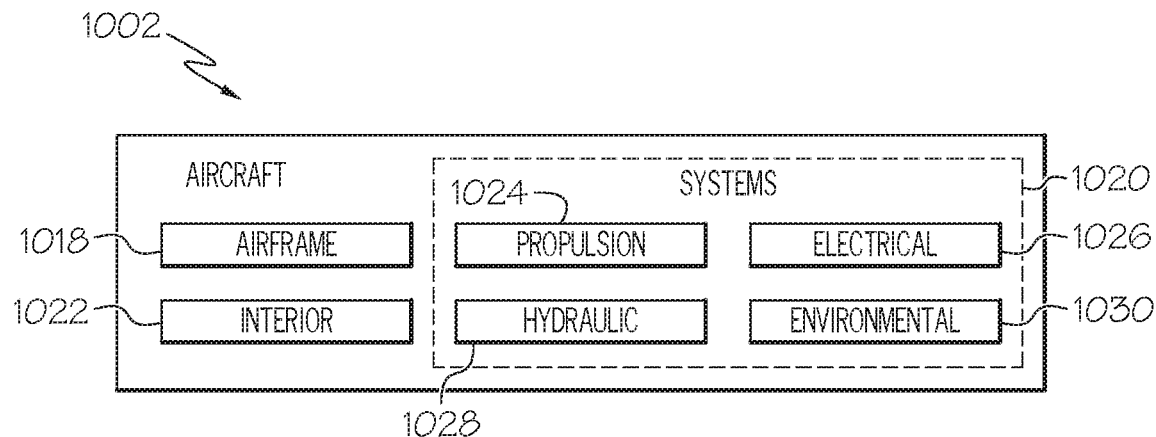
FIG. 5 is a block diagram of an aircraft.

Examples of the present disclosure may be described in the context of an aircraft manufacturing and service method 1000, as shown in FIG. 4, and an aircraft 1002, as shown in FIG. 5. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The conductive composites of the present disclosure may be employed during any one or more of the stages of the aircraft manufacturing and service method 1000, including specification and design 1004 of the aircraft 1002, material procurement 1006, component/subassembly manufacturing 1008, system integration 1010, certification and delivery 1012, placing the aircraft in service 1014, and routine maintenance and service 1016.

As shown in FIG. 5, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030.

Any number of other systems may be included. The conductive composites of the present disclosure may be employed for any of the systems of the aircraft 1002.

Although various embodiments of the disclosed conductive composite and method for manufacturing a conductive composite have been shown and described, modifications may occur to those skilled in the art upon reading the specification. The present application includes such modifications and is limited only by the scope of the claims.

What is claimed is:

1. A conductive composite comprising:
a first layer of elastomeric polymer;
a layer of electrically conductive paste on the first layer of elastomeric polymer;
a second layer of elastomeric polymer on the layer of electrically conductive paste; and
a reinforcement mesh between the first layer of elastomeric polymer and the second layer of elastomeric polymer, wherein the reinforcement mesh is infiltrated with the layer of electrically conductive paste, and wherein the reinforcement mesh is configured to move freely with respect to the first layer of elastomeric polymer and the second layer of elastomeric polymer.

2. The conductive composite of claim 1 wherein the layer of electrically conductive paste comprises a metal or alloy with a melting temperature below about 60° C. and a thickening agent.

3. The conductive composite of claim 2 wherein the metal or alloy comprises at least one of gallium, mercury, indium, tin, bismuth, phosphorus, lead, zinc, cadmium, antimony, and combinations thereof.

4. The conductive composite of claim 2 wherein the thickening agent comprises an organic thickening agent, wherein the organic thickening agent comprises at least one of maltose, carbon, and combinations thereof.

5. The conductive composite of claim 2 wherein the thickening agent has an average aspect ratio in a range of 1 to about 2.

6. The conductive composite of claim 2 wherein the thickening agent has an average aspect ratio in a range of 1 to 2 and an average maximum dimension in range of from about 0.1 to about 500 μm.

7. The conductive composite of claim 2 wherein the thickening agent has an average aspect ratio of greater than about 2.

8. The conductive composite of claim 1 wherein the layer of electrically conductive paste further comprises a compatibilizing agent.

9. The conductive composite of claim 1 wherein the layer of electrically conductive paste further comprises a compatibilizing agent, and wherein the compatibilizing agent comprises at least one of an organic compatibilizing agent, an inorganic compatibilizing agent, and combinations thereof.

10. The conductive composite of claim 1 further comprising an additive to increase thermo-oxidative stability, wherein the additive comprises at least one of a phosphate, an iron oxide, a phenolic, an antioxidant, a metal passivator, and combinations thereof.

11. The conductive composite of claim 1 wherein the first layer of elastomeric polymer comprises at least one of siloxane, fluorosiloxane, perfluoropolyether, polybutadiene, polyester, polycarbonate, polyurethane, polyurea, polyurethane-urea, epoxy, acrylate, natural rubber, butyl rubber, polyacrylonitriles, ethylene propylene diene monomer (EPDM) rubber, and combinations thereof.

12. The conductive composite of claim 1 wherein the second layer of elastomeric polymer comprises at least one of siloxane, fluorosiloxane, perfluoropolyether, polybutadiene, polyester, polycarbonate, polyurethane, polyurea, polyurethane-urea, epoxy, acrylate, natural rubber, butyl rubber, polyacrylonitriles, ethylene propylene diene monomer (EPDM) rubber, and combinations thereof.

13. The conductive composite of claim 1 wherein a thickness of the first layer of elastomeric polymer is within a range of from about 0.01 mm to about 100 mm.

14. The conductive composite of claim 1 wherein a thickness of the layer of electrically conductive paste is less than or equal to at least one of a thickness first layer of elastomeric polymer and a thickness of the second layer of elastomeric polymer.

15. The conductive composite of claim 1 wherein the layer of electrically conductive paste is homogeneous.

16. The conductive composite of claim 1 wherein the layer of electrically conductive paste is heterogeneous.

17. The conductive composite of claim 1 wherein the reinforcement mesh comprises at least one of a knit fabric, a woven fabric, and combinations thereof.

18. The conductive composite of claim 1 wherein the reinforcement mesh comprises a non-conductive fabric that comprises at least one of polyether-polyurea copolymer, latex, poly-paraphenylene terephthalamide, aramid, nylon, polyester, and combinations thereof.

19. The conductive composite of claim 1 wherein the reinforcement mesh comprises a conductive fabric that comprises at least one of conductive filaments, coated non-conductive fabric, and combinations thereof.

20. The conductive composite of claim 1 wherein the reinforcement mesh comprises a conductive fabric that comprises conductive filaments, wherein the conductive filaments comprise at least one of silver filaments, copper filaments, brass filaments, nickel filaments, stainless steel filaments, steel filaments, aluminum filaments, carbon filaments, coated carbon filaments, titanium filaments, tungsten filaments, tin filaments, zinc filaments, and combinations thereof.

21. The conductive composite of claim 1 wherein the reinforcement mesh comprises a conductive fabric that comprises coated non-conductive fabric, wherein the coated non-conductive fabric comprises at least one of metallic coated polyether-polyurea copolymer, metallic coated latex, metallic coated poly-paraphenylene terephthalamide, metallic coated aramid, metallic coated nylon, metallic coated polyester, carbon coated polyether-polyurea copolymer, carbon coated latex, carbon coated poly-paraphenylene terephthalamide, carbon coated aramid, carbon coated nylon, carbon coated polyester, and combinations thereof.

22. The conductive composite of claim 1 wherein the conductive composite exhibits a minimum sheet resistance of less than about 100 Ohm/sq.

23. The conductive composite of claim 1 wherein the conductive composite exhibits an elongation at break of greater than or equal to about 10%.

24. The conductive composite of claim 1 wherein the conductive composite exhibits a tensile strength greater than or equal to about 3 MPa.

25. The conductive composite of claim 1 wherein the conductive composite has a density of less than about 7 g/mL.

26. The conductive composite of claim 1 wherein the electrically conductive paste has a loss modulus greater than a storage modulus.

27. The conductive composite of claim 1 is a portion of an aircraft.

28. The conductive composite of claim 1 is at least a portion of at least one of a wing and a fuselage of an aircraft.

29. The conductive composite of claim 1 is at least one of a seal and a gasket.

30. The conductive composite of claim 1 wherein the layer of electrically conductive paste is a continuous layer of electrically conductive paste.

31. A method for manufacturing a conductive composite, the method comprising:
   forming a first layer of elastomeric polymer;
   forming a layer of electrically conductive paste on the first layer of elastomeric polymer, wherein a reinforcement mesh is infiltrated with the layer of electrically conductive paste; and
   forming a second layer of elastomeric polymer on the layer of electrically conductive paste, and wherein the reinforcement mesh is configured to move freely with respect to the first layer of elastomeric polymer and the second layer of elastomeric polymer.

\* \* \* \* \*